United States Patent [19]
Brinkerhoff et al.

[11] Patent Number: 6,101,460
[45] Date of Patent: Aug. 8, 2000

[54] METHOD OF FORECASTING RESOURCE NEEDS

[75] Inventors: Christopher S. Brinkerhoff; David B. Clarkson; Rick E. Isom, all of Colorado Springs, Colo.

[73] Assignee: MCI Communications Corporation, Washington, D.C.

[21] Appl. No.: 09/046,177

[22] Filed: Mar. 23, 1998

[51] Int. Cl.[7] .................................................... G06F 17/60

[52] U.S. Cl. .......................... 702/179; 702/181; 702/176; 705/10; 705/7

[58] Field of Search .................... 702/81, 82, 176–178, 702/186, 182, 183, 187, FOR 137, FOR 139, FOR 154, FOR 155, 179, 181; 364/468.06, 468.07, 468.08, 468.1; 705/7, 8, 10, 30, 32; 709/223, 224, 226, 104, 105, 107; 395/672, 673, 674, 675, 676, 677, 835, 837, 838, 839, 500.42, 500.43; 711/156; 399/79, 80; 700/91, 93

[56] References Cited

U.S. PATENT DOCUMENTS

| | | | |
|---|---|---|---|
| 4,542,458 | 9/1985 | Kitajima et al. | 364/200 |
| 5,179,587 | 1/1993 | Bock et al. | 379/95 |
| 5,459,656 | 10/1995 | Fields et al. | 705/7 |
| 5,751,969 | 5/1998 | Kapoor | 395/200.65 |
| 5,761,651 | 6/1998 | Hasebe et al. | 705/400 |
| 5,796,633 | 8/1998 | Burgess et al. | 364/551.01 |
| 5,842,199 | 11/1998 | Miller et al. | 707/2 |

*Primary Examiner*—Hal Wachsman

[57] ABSTRACT

A method of forecasting having the steps of extracting a number of computer usage records and storing the computer usage records in a records file (102). The computer usage records are then sorted according to date (104). The computer usage records are summarized within a number of date ranges to form a usage summarization record (106). A curve fitting model is applied to the usage summarization record to predict a computer usage trend curve (108). A computer usage forecast is then input (110). A computer usage growth curve is based on the computer usage forecast (112). The computer usage trend curve and the computer usage growth curve are displayed (114).

14 Claims, 10 Drawing Sheets

| | Date₁ /48 | Date₂ /50 | ... | Date₁₂ /52 |
|---|---|---|---|---|
| UG₁ /42 | UT₁₁, UT₃, UT₉ ... UT₁₀₀ <br> MIPS₁₀₁, MIPS₃ | MIP₉ | ... | MIPS₁₀₀₁ |
| UG₂ /44 | UT₄₄, UT₃₁ <br> UT₃₀₄ | MIPS₃₀₀, MIPS₄₀₁ | ... | MIPS₂₀₀₀ |
| ⋮ | ⋮ | ⋮ | ⋮ | ⋮ |
| UGₙ /46 | UT₅₀₆, UT₆₀₆ ⋮ UT₉₉₉ <br> MIPS₇ | MIPS₁₁₁₁ | ... | MIPS₉₉ |

FIG. 3

|  | Date$_1$ | Date$_2$ | ... | Date$_{12}$ |
|---|---|---|---|---|
| UG$_1$ | $\Sigma$ MIPS ~54 | $\Sigma$ ~54 |  | $\Sigma$ ~54 |
| UG$_2$ | $\Sigma$ ~54 | $\Sigma$ ~54 |  | $\Sigma$ ~54 |

FIG. 4

METHOD OF FORECASTING RESOURCE NEEDS

FIELD OF THE INVENTION

The present invention relates generally to the field of business tools and more particularly to a method of forecasting.

BACKGROUND OF THE INVENTION

The invention is described in conjunction with the problem of forecasting a computer resource, but the invention is not limited to forecasting computer resources. Companies often have large computing resources for centralized accounting, billing and other business functions. These computing resources are vital to the operation of the company and are very expensive. As a result, it is necessary to forecast the computer resource needs of the company accurately. Under estimating the required computer resources can result in a shortage of resources critical to the company's operation. This can impede the company's growth and requires a large unplanned expenditure. Over estimating the required computer resources results in tying up significant amounts of capital in an under utilized resource. This capital could have been put to better use on another project.

Present computer resource forecasting requires compiling, usually by hand, present usage of the computer resources. Once the present usage is compiled the person responsible for forecasting usually makes a guess of the usage growth based on the present usage.

Thus there exists a need for a method of forecasting, that is automated and that provides an accurate picture of present usage and likely future usage.

SUMMARY OF THE INVENTION

The present invention is directed to a method of forecasting having the steps of extracting a number of computer usage records and storing the computer usage records in a records file. The computer usage records are then sorted according to date. The computer usage records are summarized within a number of date ranges to form a usage summarization record. A curve fitting model is applied to the usage summarization record to predict a computer usage trend curve. A computer usage forecast is then input. A computer usage growth curve is based on the computer usage forecast. The computer usage trend curve and the computer usage growth curve are displayed.

By using the method of forecasting described above, the forecast is automated and repeatable. In addition, the method of forecasting includes both an extrapolation based on present usage as well as a forecast from the users.

BRIEF DESCRIPTION OF THE DRAWINGS

FIG. 3 is a schematic diagram of a sorted computer resource usage data in accordance with one embodiment of the invention;

FIG. 4 is a schematic diagram of a usage summarization record in accordance with one embodiment of the invention;

DETAILED DESCRIPTION OF THE DRAWINGS

Figure 1:
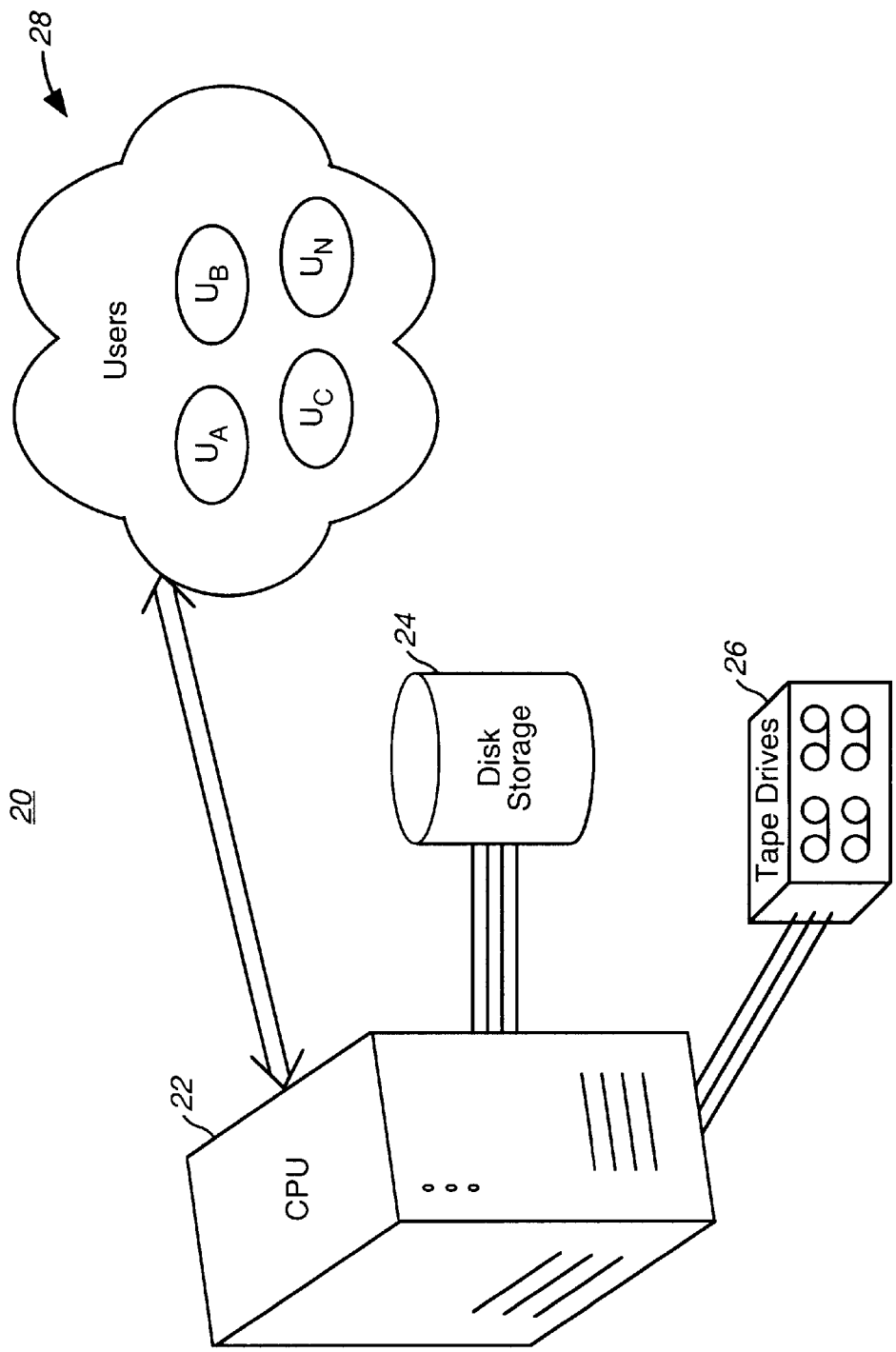
FIG. 1 is a block diagram of a computer resource center in accordance with one embodiment of the invention.

FIG. 1 is a block diagram of a computer resource center 20 in accordance with one embodiment of the invention. The computer resource center 20 is a shared resource. In one embodiment, the computer resource center includes a mainframe computer (CPU) 22. The mainframe computer 22 includes several processors that can run simultaneously. Data and programs for use on the computer 22 are stored on disk storage units 24 or on tape drives 26. These resources are very expensive and run applications critical to a company's operation. As a result it is critical that a company have adequate quantities of these resources. However, by over spending on these resources, extensive capital is invested in underutilized resources. A plurality of computer usage records 28 are stored in a records file. In one embodiment, the computer usage records 28 are stored on the disk storage 24 or the tape drives 26. In another embodiment, the computer usage records 28 are stored on a separate computer's memory. The computer usage records 28 contain an account information, a quantity of resource used and time of use. In one embodiment, a program running on the CPU 22 creates the computer usage records 28.

Figure 2:
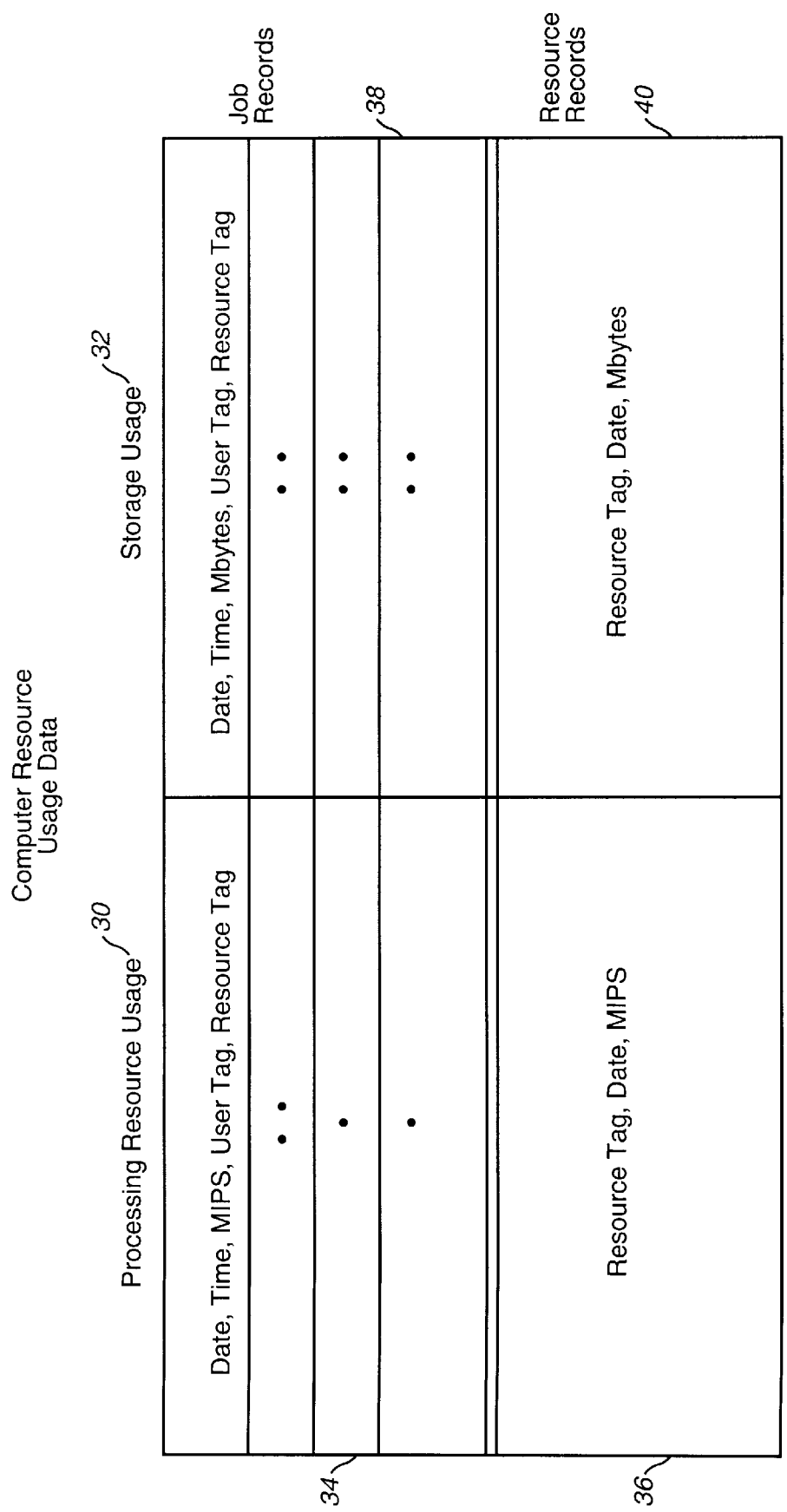
FIG. 2 is a schematic diagram of a computer resource usage data in accordance with one embodiment of the invention.

FIG. 2 is a schematic diagram of a computer resource usage data in accordance with one embodiment of the invention. The computer usage data includes processing resource usage data 30 and storage usage data 32. The storage usage data 32 may be further broken down into disk storage or tape drive storage. The processing resource usage data 30 has user files 34 that comprise a date of usage, time of usage, Million Instructions Per Second (MIPS) used, a user tag (account information) and a resource tag. The resource tag describes which of the processors (CPUs) in the computer 22 was used. In addition a computer resource center may have several mainframes. The processing resource usage data 30 includes a second type of record, resource usage files 36. The resource usage files 36 include a resource tag, a date of usage and MIPS (measure of processing resource usage) used. The resource usage files are a summary of the usage for the resource for a certain time period.

The storage usage files 32 include job records 38. The job records include: a date of usage, a time of usage, Megabytes used (measure of hard disk space used or measure of computer tape space used), a user tag (account information) and a resource tag. The resource tag describes which of the tape drives or disk drives was used. The storage records 32 also includes resource records 40. The resource records are a summary of the usage for a particular resource for a certain time period. The resource records include: a resource tag, a date of use and Megabytes (Mbytes) used. The processing resource usage record 30 and the storage usage records 32 form the raw data for creating a history of resource usage. The history is important in predicting the future requirements for the resource.

FIG. 3 is a schematic diagram of a sorted computer resource usage data in accordance with one embodiment of the invention. The sorted files 42–46 combine various account codes (UT$_{xx}$) into a family (UG$_N$). The plurality of families may be combined together into business units (lines of business or cost centers) or any other level of business unit that makes sense. Each of the sorted records are also sorted according to dates 48–52. Each data block includes the usage data (e.g., MIPS, Mbytes) used during the period of time.

FIG. 4 is a schematic diagram of a usage summarization record in accordance with one embodiment of the invention. This figure shows that the usage data is summed for each of the time periods. The summed usages 54 create a history of usage by a family over a year, for example. This information is critical for forecasting the resource usage needs for the next year. The total resource usage over a year may be determined by summing the family data. In another embodiment the total resource usage is determined by summing the resource records 36, 40. The total resource usage data is used in a curve fitting model to predict a computer resource usage trend curve. In one embodiment, the curve fitting model is a linear regression model. In another embodiment, the curve fitting model is logarithmic or quadratic or an exponential model. In another embodiment, several curve fitting models are applied to the total resource usage over a year. A measure of quality is determined for each of the curve fitting models and the curve fitting model having the best measure of quality is selected.

The history of usage by family makes it easy to determine which families or other business units are driving the future resource needs. Those families that are driving the future resource needs are asked for their likely growth in usage of the resource. This forecasted growth is added to the computer resource usage trend curve to form a computer usage growth curve.

Figure 5:
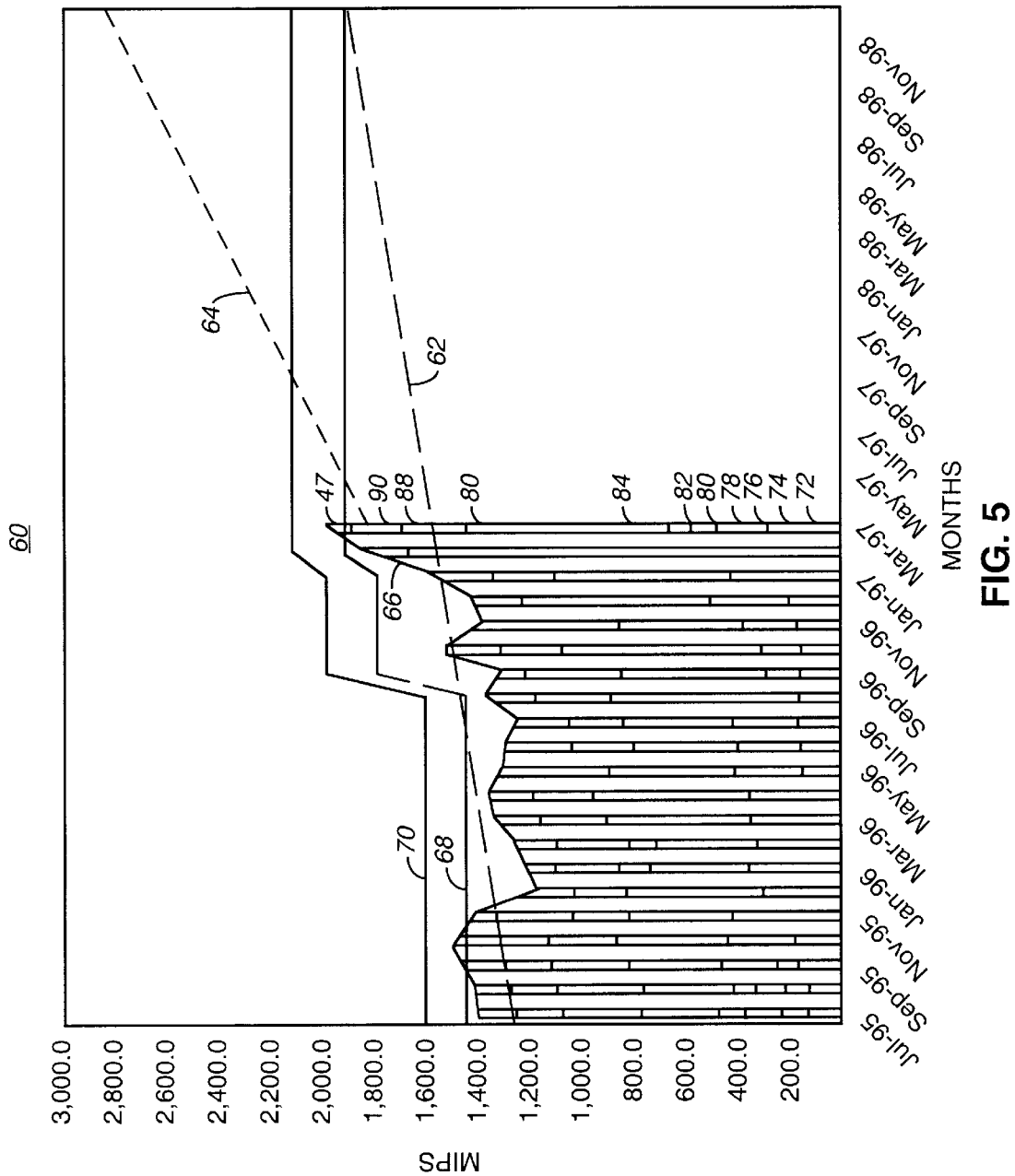
FIG. 5 is a graph of a computer usage trend curve, the computer usage growth curve and the usage summarization record in accordance with one embodiment of the invention.

FIG. 5 is a graph 60 of a computer usage trend curve 62, the computer usage growth curve 64 and the usage summarization record 66 in accordance with one embodiment of the invention. The graph 60 also shows a line 68 where resource bottle necks occur and a line 70 showing the total resources available. In the embodiment shown, the usage summarization record comprises of usages by family. The individual families 72–92 are represented by different shadings. In another embodiment the families are represent by different colors. In yet another embodiment a key shows which color (shading) belongs to which family.

Figure 6:
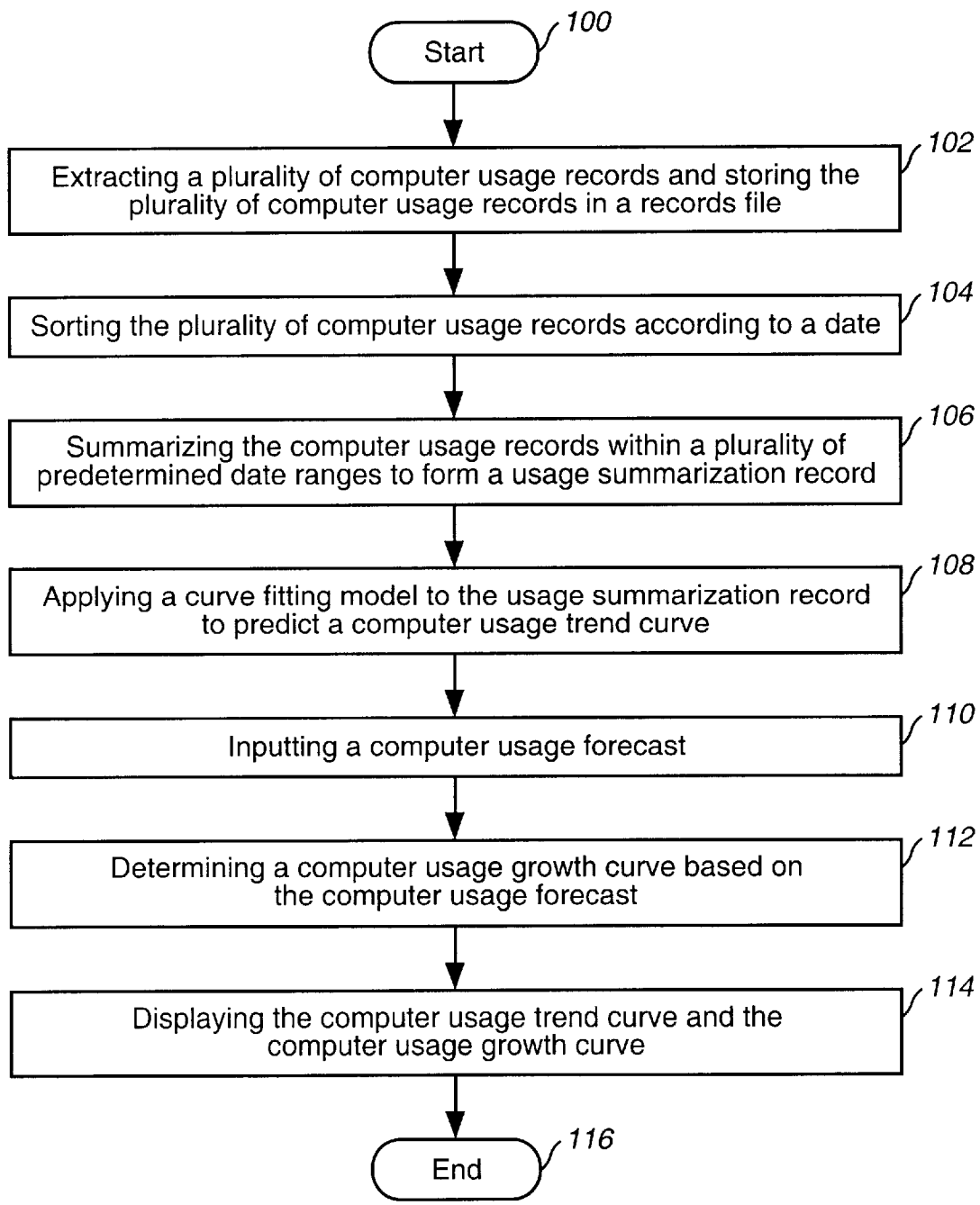
FIG. 6 is a flow chart of a method of forecasting in accordance with one embodiment of the invention.

FIG. 6 is a flow chart of a method of forecasting in accordance with one embodiment of the invention. The method starts, step 100, by extracting a plurality of computer usage records and storing the plurality of computer usage records in a records file at step 102. The plurality of computer usage records are sorted according to a date at step 104. The computer usage records are summarized for each of a plurality of predetermined date ranges to form a usage summarization record at step 106. A curve fitting model is applied to the usage summarization record to predict a computer usage trend curve at step 108. A computer usage forecast is input at step 110. A computer usage growth curve is determined based on the computer usage forecast at step 112. At step 114 the computer usage trend curve and the computer usage growth curve are displayed, which ends the process at step 116.

In another embodiment, the plurality of computer usage records are sorted into a plurality of families using an account information. The account information is part of the computer usage records. The plurality of family records are sorted into a plurality of date ranges to form a plurality of family usage records. The plurality of family usage records are then displayed. In another embodiment the plurality of computer usage records are sorted into a plurality of lines of business using the account information.

In one embodiment, a plurality of top account users are determined. Each of the top account users are surveyed to form a plurality of usage forecasts. The computer usage forecast is determined from the plurality of usage forecasts.

In yet another embodiment, a confidence level is determined for the computer usage trend curve. When the confidence level is greater than a predetermined level, the computer usage trend is used. However, when the confidence level is not greater than a predetermined level, the computer usage trend curve is disregarded.

In another embodiment, a first curve fitting model is applied to the total computer usage to predict a first computer usage trend curve. A statistical analysis is applied to the first computer usage trend curve to determine a first quality measure. A second curve fitting model is then applied to the total computer usage to predict a second computer usage trend curve. A statistical analysis is applied to the second computer usage trend curve to determine a second quality measure. The first computer usage trend curve is selected when the first quality measure is better than the second quality measure. The second computer usage trend curve is selected when the second quality measure is better than the first quality measure.

Figure 7:
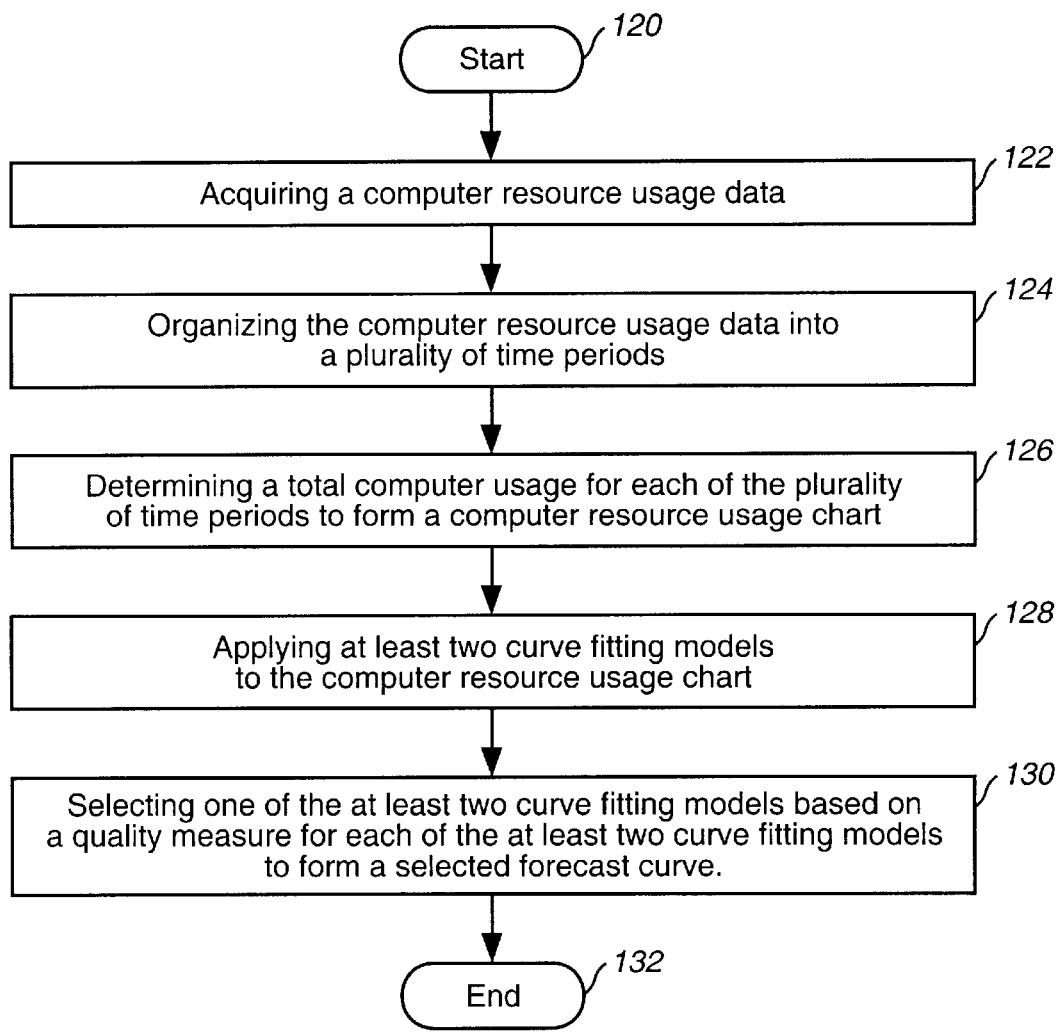
FIG. 7 is a flow chart of a method of forecasting in accordance with another embodiment of the invention.

FIG. 7 is a flow chart of a method of forecasting in accordance with another embodiment of the invention. The method may be executed by a computer performing computer readable instructions on a computer-readable storage medium. The method starts, step 120, by acquiring a computer resource usage data at step 122. The computer resource usage data is organized into a plurality of time periods at step 124. The total computer usage for each of the plurality time periods is determined to form a computer resource usage chart at step 126. At least two curve fitting models (plurality of curve fitting models) are applied to the computer resource usage chart at step 128. One of the at least two curve fitting models is selected based on a quality measure (associated quality measure) for each of the at least two curve fitting models to form a selected forecast curve at step 130, which ends the process at step 132.

In one embodiment of the method a set of the accounts forming a predetermined part of a total computer usage is determined. A forecast of a computer resource usage is received from each of the accounts in the set. A computer usage forecast curve is created from the forecast of the computer resource usage. The computer usage forecast curve and the selected forecast curve are displayed.

Figure 8:
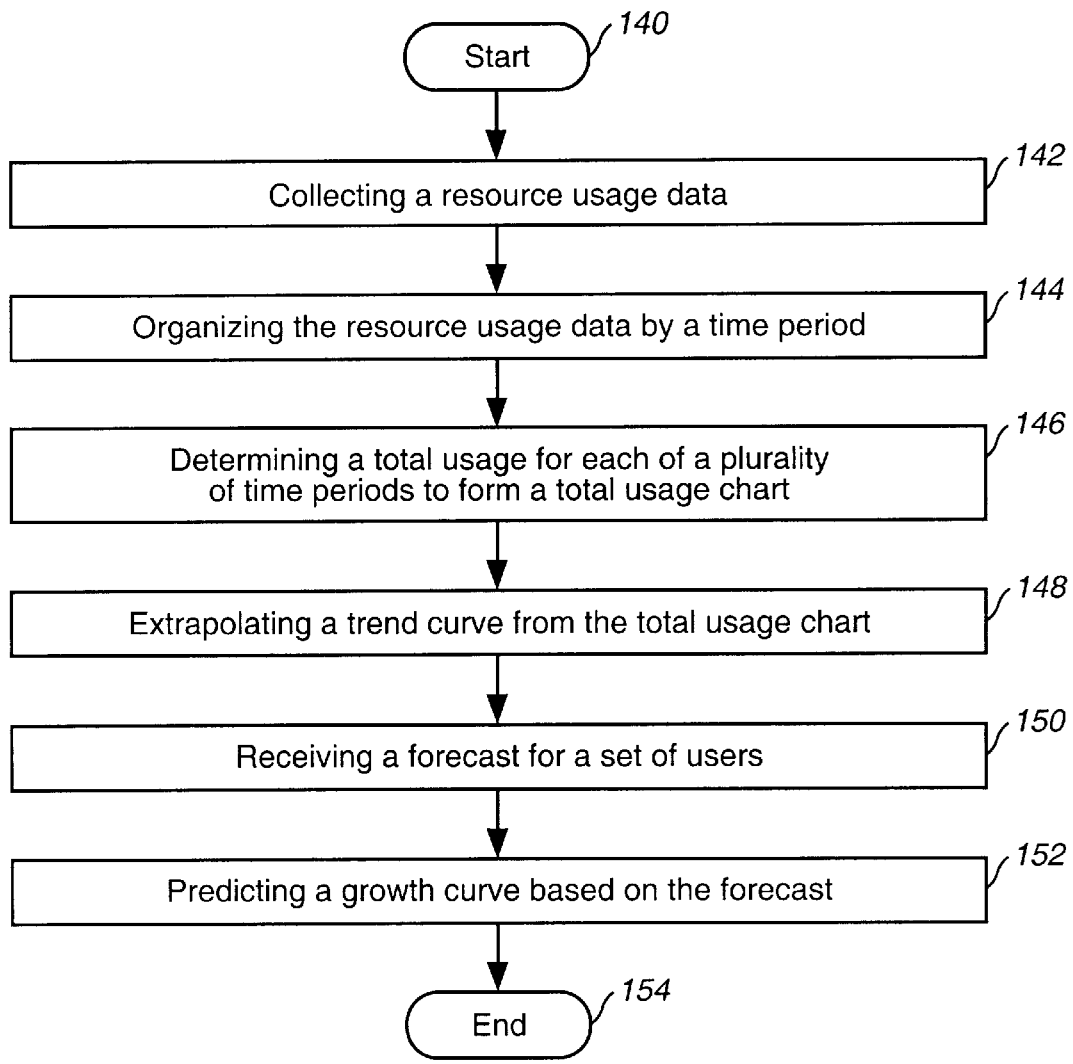
FIG. 8 is a flow chart of a method of forecasting in accordance with another embodiment of the invention.

FIG. 8 is a flow chart of a method of forecasting in accordance with another embodiment of the invention. The method starts, step 140, by collecting a resource usage data at step 142. The resource usage data is organized by a time period at step 144. A total usage for each of a plurality of time periods is determined to form a total usage chart at step 146. A trend curve is extrapolated from the total usage chart at step 148. A forecast is received for a set of users at step 150. At step 152, a growth curve is predicted based on the forecast, which ends the process at step 154.

Figure 9:
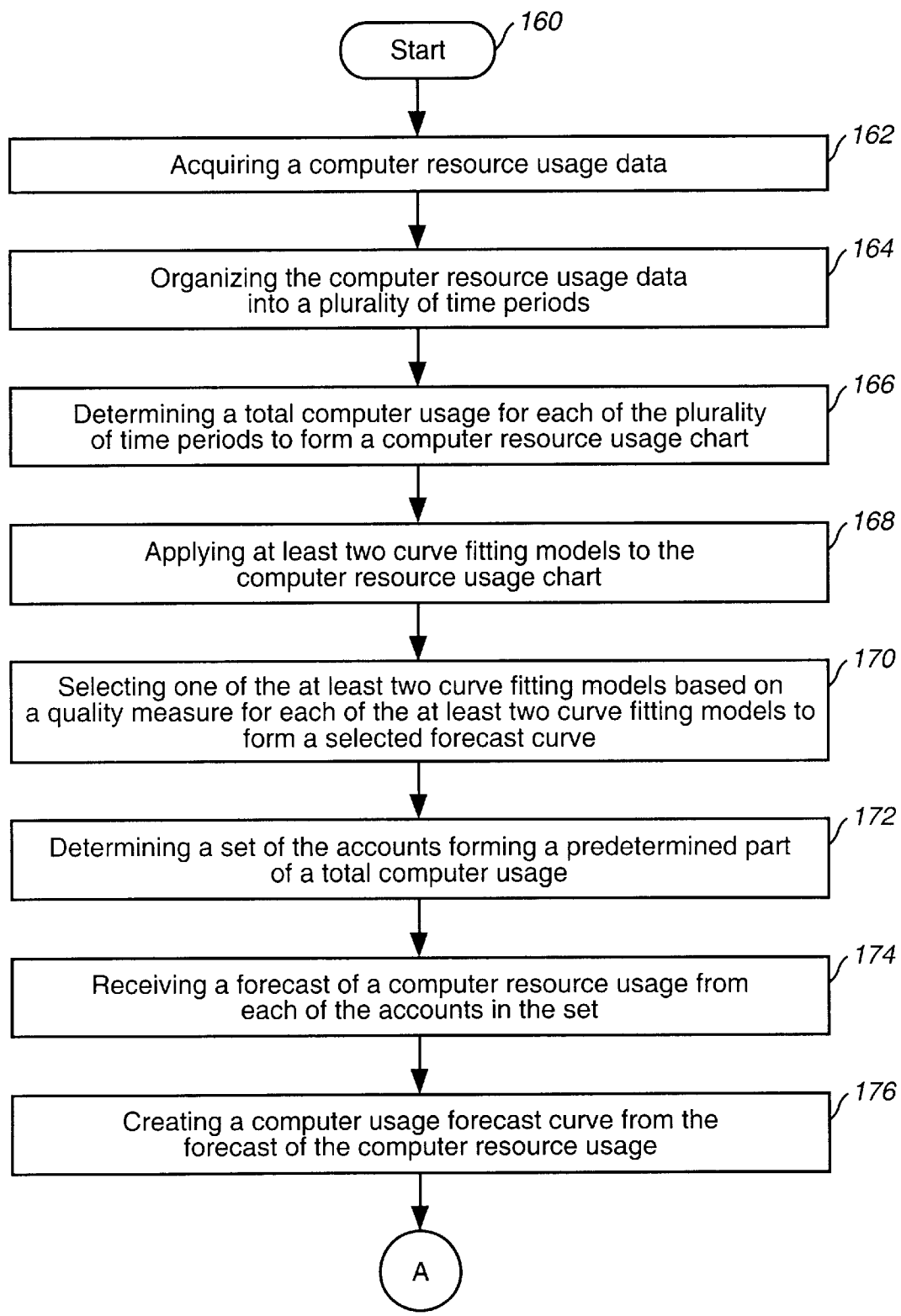
FIGS. 9 & 10 are flow charts of a method of forecasting in accordance with another embodiment of the invention.
Figure 10:
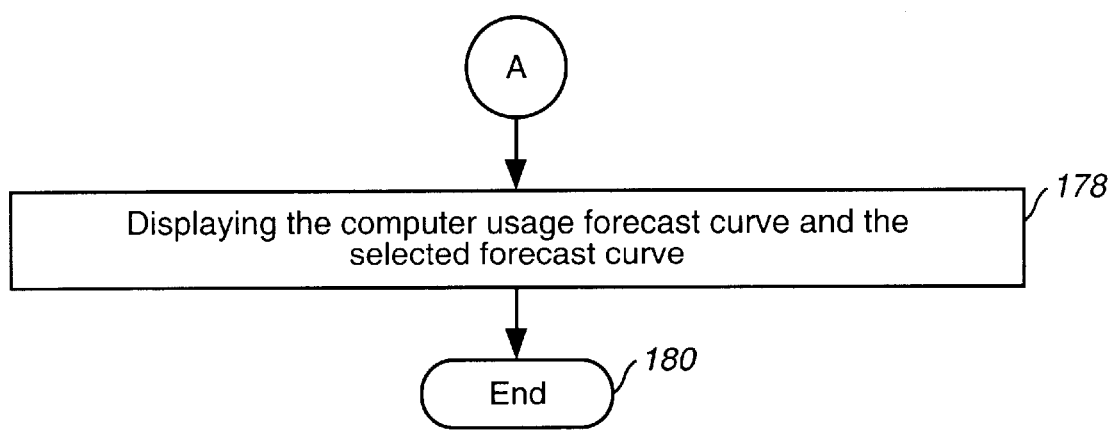

FIGS. 9 & 10 are flow charts of a method of forecasting in accordance with another embodiment of the invention. The method starts, step 160, by acquiring a computer resource usage data at step 162. The computer resource usage data is organized into a plurality of time periods at step 164. A total computer usage for each of the plurality of time periods is determined to form a computer resource usage chart at step 166. At least two curve fitting models are applied to the computer resource usage chart at step 168. One of the at least two curve fitting models are selected based on a quality measure for each of the at least two curve fitting models to form a selected forecast curve at step 170. A set of the accounts forming a predetermined part of a total computer usage are selected at step 172. A forecast of a computer resource usage is received from each of the accounts in the set at step 174. A computer usage forecast curve is created from the forecast of the computer resource usage at step 176. At step 178 the computer usage forecast curve and the selected forecast curve are displayed, which ends the process at step 180. The computer usage forecast curve and selected forecast curve may be displayed on a monitor or printed out onto paper.

Thus there has been described a method of forecasting, that is automated, repeatable and is based on both present usage trends and forecasted usage.

The methods described herein may be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A computer-implemented method of forecasting computer resource needs for a shared computer resource, comprising the steps of:
   (a) extracting a plurality of computer usage records and storing the plurality of computer usage records in a records file;
   (b) sorting the plurality of computer usage records according to a date;
   (c) summarizing the computer usage records within a plurality of predetermined date ranges to form a usage summarization record;
   (d) applying a curve fitting model to the usage summarization record to predict a computer usage trend curve;
   (e) inputting a computer usage forecast;
   (f) determining a computer usage growth curve based on the computer usage forecast; and
   (g) displaying the computer usage trend curve and the computer usage growth curve to forecast computer resource needs for the shared computer resource.

2. The computer-implemented method of claim 1, further including the steps of:
   (h) sorting the plurality of computer usage records into a plurality of families using an account information in each of the plurality of computer usage records to form a plurality of family records;
   (i) sorting the plurality of family records into the plurality of predetermined date ranges to form a plurality of family usage records;
   (j) displaying the plurality of family usage records.

3. The computer-implemented method of claim 2, wherein step (h) further includes the step of:
   (h1) sorting the plurality of computer usage records into a plurality of lines of business using the account information in each of the plurality of computer usage records to form a plurality of business records.

4. The computer-implemented method of claim 1, wherein step (e) further includes the steps of:

(e1) determining a plurality of top account users;
   (e2) surveying each of the plurality of top account users to form a plurality of usage forecasts;
   (e3) determining the computer usage forecast based on the plurality of usage forecasts.

5. The computer-implemented method of claim 1, wherein step (d) further includes the steps of:
   (d1) determining a confidence level for the computer usage trend curve;
   (d2) when the confidence level is greater than a predetermined level, using the computer usage trend curve; and
   (d3) when the confidence level is not greater than a predetermined level, disregarding the computer usage trend curve.

6. The computer-implemented method of claim 1, wherein step (d) further includes the steps of:
   (d1) applying a first curve fitting model to a total computer usage to predict a first computer usage trend curve;
   (d2) applying a statistical analysis to the first computer usage trend curve to determine a first quality measure;
   (d3) applying a second curve fitting model to the total computer usage to predict a second computer usage trend curve;
   (d4) applying the statistical analysis to the second computer usage trend curve to determine a second quality measure;
   (d5) selecting the first computer usage trend curve when the first quality measure is better than the second quality measure.

7. The computer-implemented method of claim 6, further including the step of:
   (d6) selecting the second computer usage trend curve when the second quality measure is better than the first quality measure.

8. A computer-readable storage medium comprising computer readable instructions that when executed by a computer performs the following steps:
   (a) acquiring a computer resource usage data;
   (b) organizing the computer resource usage data into a plurality of time periods;
   (c) determining a total computer usage for each of the plurality of time periods to form a computer resource usage chart;
   (d) applying at least two curve fitting models to the computer resource usage chart;
   (e) selecting one of the at least two curve fitting models based on a quality measure for each of the at least two curve fitting models to form a selected forecast curve of said computer resource usage;
   (f) determining a set of the accounts forming a predetermined part of a total computer usage;
   (g) receiving a forecast of a computer resource usage from each of the accounts in the set;
   (h) creating a computer resource usage forecast curve from the forecast of the computer resource usage; and
   (i) displaying the computer resource usage forecast curve and the selected forecast curve.

9. The computer readable storage medium of claim 8, wherein the step of acquiring the computer resource usage data includes acquiring a measure of processing resource usage.

10. The computer readable storage medium of claim 8, wherein the step of acquiring the computer resource usage data includes acquiring a measure of hard disk space used.

11. The computer readable storage medium of claim 8, wherein the step of acquiring the computer resource usage data includes acquiring a measure of computer tape space used.

12. A computer-implemented method of forecasting computer resource needs for a shared computer resource, comprising the steps of:

(a) acquiring a computer resource usage data;

(b) organizing the computer resource data into a plurality of time periods;

(c) determining a total computer resource usage for each of the plurality of time periods to form a computer resource usage chart;

(d) applying at least two curve fitting models to the computer resource usage chart;

(e) selecting one of the at least two curve fitting models based on a quality measure for each of the at least two curve fitting models to form a selected forecast curve;

(f) determining a set of accounts forming a predetermined part of a total computer resource usage;

(g) receiving a forecast of a computer resource usage from each of the accounts in the set;

(h) creating a computer usage forecast curve from the forecast of the computer resource usage; and (i) displaying the computer usage forecast curve and the selected forecast curve to forecast computer resource needs for the shared computer resource.

13. The computer-implemented method of claim 12, wherein the step of acquiring the computer resource usage data includes acquiring a measure of processing computer resource usage.

14. The computer-implemented method of claim 12, wherein the step of acquiring the computer resource usage data includes acquiring a measure of hard disk space used.

* * * * *